(12) United States Patent
Ericson et al.

(10) Patent No.: US 8,074,891 B2
(45) Date of Patent: Dec. 13, 2011

(54) CODING AND DECODING METHODS AND APPARATUSES

(75) Inventors: Petter Ericson, Malmö (SE); Mattias Bryborn, Lund (SE)

(73) Assignee: Anoto AB, Lund (SE)

( * ) Notice: Subject to any disclaimer, the term of this patent is extended or adjusted under 35 U.S.C. 154(b) by 934 days.

(21) Appl. No.: 11/922,693

(22) PCT Filed: Jun. 16, 2006

(86) PCT No.: PCT/SE2006/000731
§ 371 (c)(1),
(2), (4) Date: Dec. 21, 2007

(87) PCT Pub. No.: WO2006/135328
PCT Pub. Date: Dec. 21, 2006

(65) Prior Publication Data
US 2009/0078475 A1    Mar. 26, 2009

Related U.S. Application Data

(60) Provisional application No. 60/691,233, filed on Jun. 17, 2005.

(30) Foreign Application Priority Data

Jun. 17, 2005 (SE) .................................... 0501400.6

(51) Int. Cl.
*G06K 19/06* (2006.01)
(52) U.S. Cl. ........................................ 235/494; 235/454
(58) Field of Classification Search .................. 235/494, 235/375, 454, 460
See application file for complete search history.

(56) References Cited

U.S. PATENT DOCUMENTS

| | | | |
|---|---|---|---|
| 5,051,736 | A | 9/1991 | Bennett et al. |
| 5,145,518 | A | 9/1992 | Winnik et al. |
| 5,168,147 | A | 12/1992 | Bloomberg |
| 5,194,852 | A | 3/1993 | More et al. |
| 5,208,630 | A | 5/1993 | Goodbrand et al. |
| 5,221,833 | A | 6/1993 | Hecht |

(Continued)

FOREIGN PATENT DOCUMENTS

EP        0 764 944 A2    3/1997

(Continued)

OTHER PUBLICATIONS

Notice of Allowance mailed Mar. 25, 2005, in U.S. Appl. No. 09/812,885 (6 pages).

(Continued)

*Primary Examiner* — Edwyn Labaze
(74) *Attorney, Agent, or Firm* — Finnegan, Henderson, Farabow, Garrett & Dunner LLP (57) ABSTRACT

A combined position and information code, which could be applied on a base, comprises a position code, which comprises a plurality of coding marks and which codes a plurality of positions. Each position in the position code is coded by a predetermined number of coding marks. Groups of coding marks are defined in the position code. The number of coding marks in each group is larger than the predetermined number of coding marks. At least some of the coding marks in each group are used for coding an information item. When decoding the combined code, part areas of the combined code are imaged. A position is decoded from each imaged part area, whereas the information item has to be decoded from at least two part areas.

18 Claims, 4 Drawing Sheets

U.S. PATENT DOCUMENTS

| | | | |
|---|---|---|---|
| 5,225,900 | A | 7/1993 | Wright |
| 5,245,165 | A | 9/1993 | Zhang |
| 5,256,193 | A | 10/1993 | Winnik et al. |
| 5,271,764 | A | 12/1993 | Winnik et al. |
| 5,286,286 | A | 2/1994 | Winnik et al. |
| 5,291,243 | A | 3/1994 | Heckman et al. |
| 5,329,107 | A | 7/1994 | Priddy et al. |
| 5,343,031 | A | 8/1994 | Yoshida |
| 5,434,371 | A | 7/1995 | Brooks |
| 5,477,012 | A | 12/1995 | Sekendur |
| 5,515,456 | A | 5/1996 | Ballard |
| 5,652,412 | A | 7/1997 | Lazzouni et al. |
| 5,661,506 | A | 8/1997 | Lazzouni et al. |
| 5,852,434 | A | 12/1998 | Sekendur |
| 5,896,403 | A | 4/1999 | Nagasaki et al. |
| 5,897,669 | A | 4/1999 | Matsui |
| 5,900,943 | A | 5/1999 | Owen |
| 5,903,667 | A | 5/1999 | Kuzunuki et al. |
| 5,912,869 | A | 6/1999 | Tanaka et al. |
| 5,913,105 | A | 6/1999 | McIntyre et al. |
| 5,937,110 | A | 8/1999 | Petrie et al. |
| 6,000,613 | A | 12/1999 | Hecht et al. |
| 6,047,892 | A | 4/2000 | Schuessler et al. |
| 6,058,498 | A | 5/2000 | Nagasaki et al. |
| 6,076,734 | A | 6/2000 | Dougherty et al. |
| 6,081,261 | A | 6/2000 | Wolff et al. |
| 6,186,405 | B1 | 2/2001 | Yoshioka |
| 6,201,903 | B1 | 3/2001 | Wolff et al. |
| 6,208,771 | B1 | 3/2001 | Jared et al. |
| 6,330,976 | B1 | 12/2001 | Dymetman et al. |
| 6,502,756 | B1 | 1/2003 | Fåhraeus |
| 6,516,037 | B1 | 2/2003 | Wei |
| 6,571,025 | B2 | 5/2003 | Nada |
| 6,586,688 | B2 | 7/2003 | Wiebe |
| 6,603,464 | B1 | 8/2003 | Rabin |
| 6,627,870 | B1 | 9/2003 | Lapstun et al. |
| 6,667,695 | B2 | 12/2003 | Pettersson et al. |
| 6,864,880 | B2 | 3/2005 | Hugosson et al. |
| 6,898,334 | B2 | 5/2005 | Sayers |
| 6,957,768 | B1 | 10/2005 | Silverbrook et al. |
| 7,175,095 | B2 | 2/2007 | Pettersson et al. |
| 7,249,716 | B2 | 7/2007 | Bryborn |
| 7,408,536 | B2 | 8/2008 | Hugosson et al. |
| 7,475,824 | B2 | 1/2009 | Yoshida |
| 7,600,693 | B2 | 10/2009 | Pettersson |
| 2002/0091711 | A1 | 7/2002 | Ericson |
| 2002/0163511 | A1* | 11/2002 | Sekendur ............. 345/179 |
| 2003/0061188 | A1* | 3/2003 | Wiebe et al. ............. 707/1 |
| 2003/0066896 | A1 | 4/2003 | Pettersson et al. |
| 2003/0122855 | A1 | 7/2003 | Pattersson |
| 2003/0141375 | A1 | 7/2003 | Lawandy |
| 2004/0035935 | A1 | 2/2004 | Takahashi et al. |
| 2009/0078475 | A1 | 3/2009 | Ericson et al. |

FOREIGN PATENT DOCUMENTS

| | | |
|---|---|---|
| EP | 0 996 083 A2 | 4/2000 |
| EP | 0 984 390 B1 | 2/2009 |
| GB | 2 306 669 A | 5/1997 |
| GB | 2 329 300 A | 3/1999 |
| JP | 10-257309 | 9/1998 |
| JP | 2001-195536 | 7/2001 |
| JP | 2004-94907 | 3/2004 |
| WO | WO 92/17859 | 10/1992 |
| WO | WO 99/50787 | 10/1999 |
| WO | WO 00/73983 A1 | 12/2000 |
| WO | WO 01/16691 A1 | 3/2001 |
| WO | WO-01/26032 A1 | 4/2001 |
| WO | WO 01/26032 A1 | 4/2001 |
| WO | WO 01/26033 A1 | 4/2001 |
| WO | WO 01/26034 A1 | 4/2001 |
| WO | WO 01/31576 A1 | 5/2001 |
| WO | WO 01/41055 A1 | 6/2001 |
| WO | WO 01/48685 A1 | 7/2001 |
| WO | WO 01/71654 A1 | 9/2001 |
| WO | WO 01/75773 A1 | 10/2001 |
| WO | WO 01/75781 A1 | 10/2001 |
| WO | WO 01/75783 A1 | 10/2001 |
| WO | WO 02/064380 A1 | 8/2002 |
| WO | WO 02/097698 A1 | 12/2002 |
| WO | WO 03/042912 A1 | 5/2003 |
| WO | WO 03/049023 A1 | 6/2003 |
| WO | WO 03/065301 A1 | 8/2003 |
| WO | WO 03/107265 A1 | 12/2003 |
| WO | WO-2004/038651 A1 | 5/2004 |
| WO | WO 2004/038651 A1 | 5/2004 |
| WO | WO 2004/057526 | 7/2004 |
| WO | WO-2006/135329 A1 | 12/2006 |
| WO | WO 2006/135329 A1 | 12/2006 |

OTHER PUBLICATIONS

Office Action mailed Mar. 24, 2004, in U.S. Appl. No. 09/812,885 (10 pages).
Office Action mailed Jan. 13, 2005, in U.S. Appl. No. 09/812,885 (6 pages).
Notice of Allowance mailed Mar. 31, 2008, in U.S. Appl. No. 11/033,158 (4 pages).
Office Action mailed May 4, 2007, in U.S. Appl. No. 11/033,158 (8 pages).
Office Action mailed Oct. 18, 2007, in U.S. Appl. No. 11/033,158 (7 pages).
Office Action mailed Jan. 29, 2003, in U.S. Appl. No. 09/813,114 (10 pages).
Office Action mailed Aug. 12, 2003, in U.S. Appl. No. 09/813,114 (8 pages).
Office Action mailed Mar. 8, 2004, in U.S. Appl. No. 09/813,114 (7 pages).
Office Action mailed Sep. 19, 2006, in U.S. Appl. No. 10/516,590 (5 pages).
Office Action mailed Sep. 30, 2004, in U.S. Appl. No. 10/242,358 (7 pages).
Office Action mailed Nov. 14, 2003, in U.S. Appl. No. 10/242,358 (8 pages).
Office Action mailed Jun. 3, 2005, in U.S. Appl. No. 10/242,358 (6 pages).
Office Action mailed Nov. 14, 2005, in U.S. Appl. No. 10/242,358 (7 pages).
Office Action mailed Dec. 24, 2008, in U.S. Appl. No. 10/516,592 (7 pages).
Office Action mailed Jun. 27, 2008, in U.S. Appl. No. 10/516,592 (6 pages).
Notice of Allowance mailed Oct. 7, 2004, in U.S. Appl. No. 09/813,114 (5 pages).
Notice of Allowance mailed Mar. 27, 2007, in U.S. Appl. No. 10/516,590 (7 pages).
Notice of Allowance mailed Jun. 9, 2006, in U.S. Appl. No. 10/242,358 (6 pages).
Notice of Allowance mailed Sep. 27, 2006, in U.S. Appl. No. 10/242,358 (6 pages).
Notice of Allowance mailed Jun. 2, 2009, in U.S. Appl. No. 10/516,592 (7 pages).
"Graphical Design Tool User Guide" written by Technical Publications at Anoto AB, 2002 (6 pages).
F. Jessie MacWilliams et al., "Pseudo-Random Sequences and Arrays", Proceedings of the IEEE, vol. 64, No. 12, Dec. 1976 (11 pages).
Marc Dymetman et al., "Intelligent Paper", Xerox Research Centre Europe, Apr. 1998 (4 pages).
Communication from Japanese Patent Office Action in Japanese Application No. JP 2007-5189009 dated Jul. 5, 2011 and translation thereof. (8 pages including 3 pages of communication and 5 pages of translation.).
Communication from Japanese Patent Office Action in Japanese Application No. JP 2008-516791 dated Aug. 2, 2011 and translation thereof. (5 pages including 2 pages of communication and 3 pages of translation.).
Communication from Korean Patent Office in Korean Application No. 10-2007-7001974 dated Sep. 6, 2011 and translation thereof. (15 pages including 7 pages of communication and 8 pages of translation.).

* cited by examiner

| 1 | | 2 | | 3 | | 4 | | 5 | | 6 | | 7 | | 8 | |
|---|---|---|---|---|---|---|---|---|---|---|---|---|---|---|---|
| | 9 | | 10 | | 11 | | 12 | | 13 | | 14 | | 15 | | 16 |
| 17 | | 18 | | 19 | | 20 | | 21 | | 22 | | 23 | | 24 | |
| | 25 | | 26 | | 27 | | 28 | | 29 | | 30 | | 31 | | 32 |
| 33 | | 34 | | 35 | | 36 | | 37 | | 38 | | 39 | | 40 | |
| | 41 | | 42 | | 43 | | 44 | | 45 | | 46 | | 47 | | 48 |
| 49 | | 50 | | 51 | | 52 | | 53 | | 54 | | 55 | | 56 | |
| | | 60 | | 61 | | 62 | | 63 | | | | ... | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | ... | | 125 | | 126 | | 127 | | 128 | |

Fig. 6

| 1 2 3 ....8<br>.9 10 11...<br>. (xi=0, yi=0)<br><br>... 128 | 2 3 4 ....9<br>.10 11 12...<br>. (xi=1, yi=0)<br><br>... 128 1 | 3 4 5 ....10<br>. 11 12 13...<br>. (xi=1, yi=1)<br><br>... 128 1 2 |
|---|---|---|
| 2 3 4 .....9<br>.10 11 12...<br>. (xi=0, yi=1)<br><br>... 128 1 | 3 4 5 ....10<br>. 11 12 13...<br>. (xi=1, yi=1)<br><br>... 128 1 2 | 4 5 6 .... 11<br>.12 13 14 ...<br>. (xi=2, yi=1)<br><br>... 128 1 2 3 |

CODING AND DECODING METHODS AND APPARATUSES

CROSS-REFERENCE TO RELATED APPLICATIONS

The present application claims the benefit of Swedish patent application no. 0501400-6, filed on Jun. 17, 2005 and U.S. provisional patent application No. 60/691,233, filed on Jun. 17, 2005, both of which are hereby incorporated by reference.

FIELD OF THE INVENTION

The present invention generally relates to coding and decoding of information, and more specifically to the coding and decoding of a combined information and position code, which enables electronic recording of pen strokes and simultaneous recording of further information to be used for e.g. the processing of the pen strokes.

BACKGROUND ART

Information management systems for managing handwritten information are known; see e.g. US 2003/0061188, US 2003/046256 and US 2002/0091711. In these systems an electronic pen records pen strokes made on a base provided with a position code which codes a plurality of absolute positions on the base. The pen records the pen strokes by imaging the position code at the tip of the pen and decoding the coded positions so that a sequence of positions reflecting the pen movement is obtained.

The position code on each base is a subset of a much larger abstract position code. Thus, different bases may be provided with different subsets of the overall position code. Also, different processing rules may be associated with different subsets of the position code, thereby creating an information management system where the processing of the recorded information depends on which base the information is recorded from.

The position code proposed in the above information management systems comprises a very large number of simple symbols of substantially similar appearance. The position code does not include any information about the processing of the recorded pen strokes. It exclusively codes position information. From a flexibility and printability perspective, this approach is highly beneficial. However, it may require that other units in the system possess processing and routing information related to the different subsets of the overall position code and that these units are available when needed. Alternatively, a user may need to provide processing and routing information.

In an information management system of the above-referenced type, the pen may store information about the subdivision of the overall position code and processing rules associated with different subsets of the position code. Furthermore, an intermediary server, to which information recorded by the pen is transmitted, may have a database linking subsets of the position code with addresses to different application servers which may be the intended recipients of the pen strokes recorded from different bases. Finally, the different application servers may store information about the different bases enabling them to process the received information in the intended way.

In some situations it would be preferable if the processing and/or routing information could be embedded in the base so that other parts of the system do not need to store this information.

U.S. Pat. No. 6,864,880 discloses a product having a writing area which is provided with a position-coding pattern for recording handwritten information and an address area which is provided with an address-coding pattern which codes an address to which the handwritten information is to be sent.

US 2003/0066896 discloses that further information can be coded in a position code, which comprises a plurality of marks having a first parameter which varies for the coding of position information, by varying a second independent parameter of the marks for coding of the further information. The first parameter could for instance be the location of the mark and the second parameter the size of the mark. The position code is divided into cells for coding of the further information. Each cell comprises a predetermined number of marks. The suggested cell size is 2*2 marks. With this cell size, the pen will always see at least one complete cell within its field of view. However, this cell size may not be sufficient to code e.g. explicit processing and/or routing information. For instance, the Internet Protocol version 4 uses a 32 bit addressing scheme. Another drawback may be that the system requires addition of an algorithm for detection of the second independent parameter used for coding the further information.

SUMMARY OF THE INVENTION

One object of the present invention is to wholly or partly overcome one or more of the problems indicated above.

This object is achieved by a method and an apparatus for generating a combined code according to claim 1 and claim 10, respectively, and a method and an apparatus for decoding a combined code according to claim 11 and 18, respectively, as well as a method and an apparatus for generating a combined code according to claim 19 and claim 21, respectively, and method and apparatus for decoding a combined code according to claim 22 and claim 23, respectively.

According to one aspect of the invention, a method for generating a combined position and information code to be applied on base comprises generating an electronic representation of a position code, which comprises a plurality of coding marks and which codes a plurality of positions, each position being coded by a first predetermined number of coding marks, defining groups of coding marks in the position code, each group including a larger number of coding marks than said predetermined number of coding marks, and coding an information item in said groups of coding marks by using at least some of the coding marks in each group of coding marks.

The method is based on the realization that the pen does not have to see all the coding marks that code an information item within its field of view. It suffices that the pen has seen all the coding marks when the pen user has completed his or her writing on the base. Thus, if e.g. the information item is repeatedly coded on the base in such a way that the pen sees some of the information item coding marks within its field of view and the pen is moved over the base, the pen will eventually see all the coding marks coding the information item and then be able to decode it.

The information item may comprise two or more elements. The likelihood that the pen will see all information item elements during the writing by the pen on the base may be increased by coding the order in which the elements appear in the groups of coding marks differently in different groups. A predefined permutation rule may for instance be used to permute the information element between successive groups. Other schemes for varying the coding of the information elements in different groups are also conceivable.

The method for generating the combined code may be part of a method for providing a base, which is intended to be used together with a digital pen for electronic recording and processing of pen strokes.

According to another aspect of the invention, an apparatus for generating a combined position and information code to be applied on base, comprises a coding module having means for generating an electronic representation of a position code, which comprises a plurality of coding marks and which codes a plurality of positions, each position being coded by a predetermined number of coding marks, means for defining groups of coding marks in the position code, each group including a larger number of coding marks than said predetermined number of coding marks, and means for coding an information item in said groups of coding marks by using at least some of the coding marks in each group of coding marks.

The apparatus may be a general purpose computer or server, a printer, or any other specifically adapted apparatus having a coding module implemented in software, firmware, hardware or any combination thereof. The means for generating, the means for defining and the means for coding may e.g. each be implemented by a set of instructions which is executed by a processor or by specifically-adapted hardware circuitry.

According to a further aspect of the invention, a method for decoding a combined position and information code, which comprises a plurality of coding marks, which code a plurality of positions, each position being coded by a predetermined number of coding marks, and an information item, said method comprising receiving a series of electronic representations of different parts of the combined code, each representation comprising at least said predetermined number of coding marks but only a subset of the coding marks coding said information item, determining a position from each one of the electronic representations, and decoding the information item using coding marks from at least two of the electronic representations.

In the decoding process, each electronic representation thus results in a position, whereas two or more electronic representations are required to obtain the information item. The electronic representation may be any appropriate electronic representation of a part of the combined code. It may for instance correspond to a raw image of a part of the combined code or to a more or less processed version of the content of the image.

According to yet another aspect of the invention, an apparatus is provided for decoding a combined position and information code, which comprises a plurality of coding marks, which code a plurality of positions, each position being coded by a predetermined number of coding marks, and an information item, said apparatus comprising a decoding module having means for receiving a series of electronic representations of different parts of the combined code, each representation comprising at least said predetermined number of coding marks but only a subset of the coding marks coding said information item, means for determining a position from each one of the electronic representations, and means for decoding the information item using coding marks from at least two of the electronic representations.

The apparatus may be any general purpose computer or server, a digital pen, or any other specifically adapted apparatus having a decoding module implemented in software, firmware, hardware or any combination thereof. The means for determining and the means for decoding may e.g. each be implemented by a set of instructions which is executed by a processor or by specifically-adapted hardware circuitry. The means for receiving may be an interface to an internal or external module or device.

According to yet another aspect of the invention, a method for generating a combined position and information code to be applied on base, comprises generating an electronic representation of a position code, which codes a plurality of positions, each position being coded by a first predetermined number of coding marks, overlaying an electronic representation of an information code on the position code to create the combined code, said information code coding at least one information item by using a predetermined number of coding marks, wherein both the positions and the information item are coded by displacing the coding marks from respective nominal positions defined by a grid.

The combined code may be found by users to have a more homogeneous appearance than if two independent parameters are used for coding the information item and the positions.

The last-mentioned method may be carried out in an apparatus which comprises a coding module having means for performing the different steps of the method. The apparatus may be a general purpose computer or server, a printer, or any other specifically adapted apparatus having a coding module implemented in software, firmware, hardware or any combination thereof. The means for generating and the means for overlaying may e.g. each be implemented by a set of instructions which is executed by a processor or by specifically-adapted hardware circuitry.

According to yet another aspect of the invention, a method for decoding a combined position and information code, comprises receiving an electronic representation of a part of said combined position and information code, localizing at least one position-coding mark, which contributes to the coding of a position, in said electronic representation, determining a direction of displacement from a nominal position of said at least one position-coding mark, localizing at least one information-coding mark, which contributes to the coding of an information item, in said electronic representation, and determining an amount of displacement from a nominal position of said at least one information-coding mark.

This decoding method may be carried out in an apparatus which comprises a decoding module having means for performing the steps of the decoding method. The apparatus may be any general purpose computer or server, a digital pen, or any other specifically adapted apparatus having a decoding module implemented in software, firmware, hardware or any combination thereof. The means for localization and the means for determining may e.g. each be implemented by a set of instructions which is executed by a processor or by specifically-adapted hardware circuitry. The means for receiving may be an interface to an internal or external module or device.

BRIEF DESCRIPTION OF THE DRAWINGS

The invention will now be described more in detail by way of examples, reference being had to the accompanying schematic drawings.

DETAILED DESCRIPTION OF EMBODIMENTS OF THE INVENTION

Figure 1:
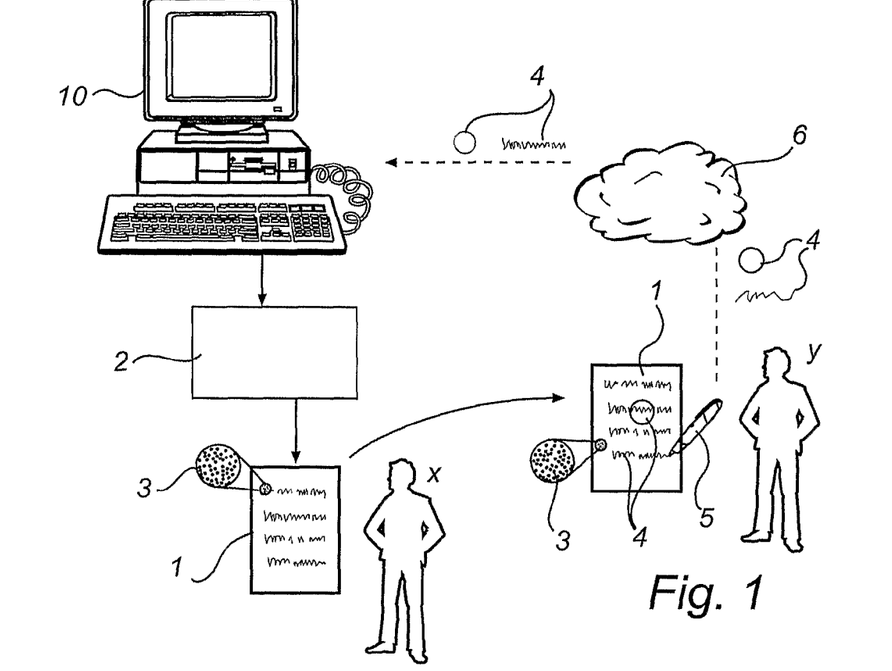
FIG. 1 is a schematic overview of a system in which the present invention may be used.

FIG. 1 shows an example of a system in which a base with a combined code can be used.

Assume that a person X has created a document, which is stored in a memory of his computer 10. X wants a person Y to review the content of the document. X prints the document 1 using a printer 2. The base could be made of any material which makes the base suitable for being printed on. A position code 3, a part of which is schematically shown in enlarged format in the figure, is overlaid on the content of the document in the printing process. The position code 3 enables Y to electronically record annotations 4 made by him using a digital pen 5, which records the position code on the document.

It would now be beneficial if the annotations stored in Y's pen 5 could be transmitted back to X's computer 10 and incorporated in the original document for X's review. To achieve this, Y's pen 5 or another unit to which Y's pen transfers the electronically recorded annotations 4, needs to know the address to which the annotations are to be sent. One way of solving this problem, would be to have an intermediary server storing an association between the positions coded by the position code 3 on X's document and the network address of X's computer. This solution requires, however, that the intermediary server is available and has been informed about what subset of the position code has been printed on X's document and the address where to send the annotations.

Another way would be to print an indication of the network address of X's computer in a separate field on the document, so that it could be recorded by Y's pen. The network address could be printed in coded or explicit form.

A more flexible solution would be to overlay an information code, which codes the required address information, on the position code 3 which is printed on X's document. In this way, Y's pen 5 can capture the address information while recording the annotations 4 and use it to send the annotations directly to X's computer 10, for instance via a network 6, such as the Internet or a public telecommunication system, using preexisting general messaging concepts, like e-mail, SMS, fax, HTTP, or FTP.

The system shown in FIG. 1 is but an example of a system in which the idea of embedding explicit address or routing information in a base could be useful. Many other applications and variants of this idea are conceivable.

Figure 2:
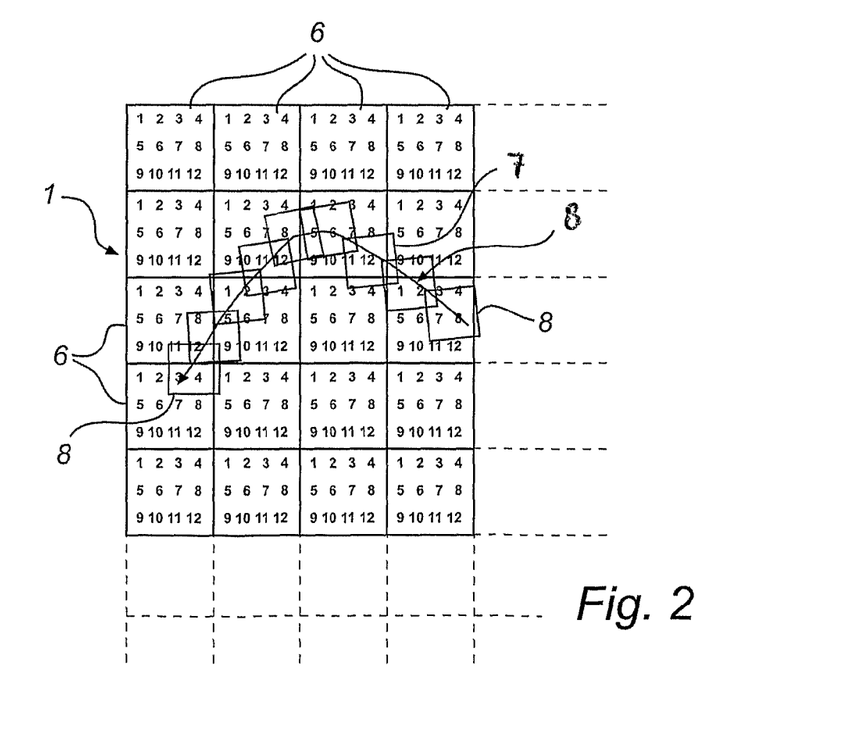
FIG. 2 is a schematic illustration of an embodiment of an information code.

FIG. 2 illustrates some basic principles of an exemplary information code which can be overlaid on or integrated with or embedded in a position code on a base, such as position code 3 on X's document 1 to create a combined code. The information code may consist of a number of cells 6 which tile the surface of a base 1, such as a paper. The cells may have fixed positions in relation to the position code (not shown in FIG. 2) and thus cell coordinates of a current cell seen by a digital pen moving over the combined code can be determined from the position code, provided that the size of the cells are known. Each cell may code the same piece of information by means of a plurality of coding symbols in each cell. Each cell thus codes one instance of the information item. The information item may consist of a plurality of information item elements. In the example shown in FIG. 2, the information item consists of twelve elements numbered 1-12 in the cells 6. Each element may be coded by one or more coding symbols or marks. The information item may e.g. consist of binary data, each bit of which is coded by one coding symbol in the information code. Each information item element may thus represent one or more data bits.

As soon as a current position of the pen has been determined by means of the position code, the current cell seen by the pen can be determined using the cell size. Also, the number of each information item coding symbol seen by the pen and the corresponding information item element number can be determined using the position code, the cell size and information about how the information item is coded by the coding symbols.

A user may make one or more pen strokes 7 on the document 1. A pen stroke may be recorded as a sequence of spatially and temporally related positions. The pen may for instance be provided with a contact detector which detects when the pen is put down on the base and subsequently lifted from the base. The positions recorded between a "pen-down" and the next "pen-up" may be defined as a pen stroke.

While a pen stroke 7 is made, the digital pen typically moves across a number of cells 6. The field of view of the pen may, however, not be sufficiently large for the pen to record one complete information code cell in a single image. In the example of FIG. 2, each image 8 captured by the pen during a pen stroke 7 will include only a couple of information elements. But as the pen moves, further images 8 including different information elements in different cells will be captured and eventually all the elements 1-12 of the information item will be recorded. The pen may then use the information about the elements gathered from different cells to decode the information item that is repeatedly coded in the cells of the information code.

The information item coded in the cells of the information code can be any information that can be coded by the available information space in a cell. It may be non-positional data. It can for instance be an address indication, e.g. an e-mail address of an originator of a document or a URL to which a document is to be sent, or information about the layout of the base which helps an application which receives information from the base to correctly process the information, or encryption information, e.g. an encryption key, which may be used to encrypt pen strokes recorded from the base, or an access information item, which may be used to restrict usage of the base to certain pens.

The position code on which the information code is overlaid can be any kind of position code that codes absolute positions on a surface. Each position can be coded by a single symbol, which, depending on the number of positions coded by the position code, may be rather complex. Alternatively, each position may be coded by two or more less complex symbols. The simplest symbols can be used in position codes where each symbol only codes one of two possible values. In this case the symbol only has to have two discernible states.

Also, the position code may tile the base, such that each position is coded by means of one or more symbols that are used exclusively for coding that position. Alternatively the position code may be "floating" such that any part area of a predetermined size of the position code defines a position. In this case at least some of the symbols that are used for coding a position also contribute to the coding of another position.

Below follows an exemplifying description of a specific position code that can be used in a combined code, which codes both position indications and one or more recurrent pieces of information. The position code is of the kind described in U.S. Pat. No. 6,667,695, which is hereby incorporated by reference and to which reference can be made for further details.

The position code is based on a number sequence which below is referred to as a difference number sequence. This difference number sequence has the property that if one takes an arbitrary partial sequence of a predetermined length, for instance a partial sequence with five difference numbers, this partial sequence always has an unambiguously determined location in the difference number sequence. In other words, it appears only once in the difference number sequence and can thus be used for position determination. A sequence having this property is sometimes called a DeBruijn sequence. More specifically, the difference number sequence "runs" along the x axis as well as along the y axis of the position code.

Figure 3:
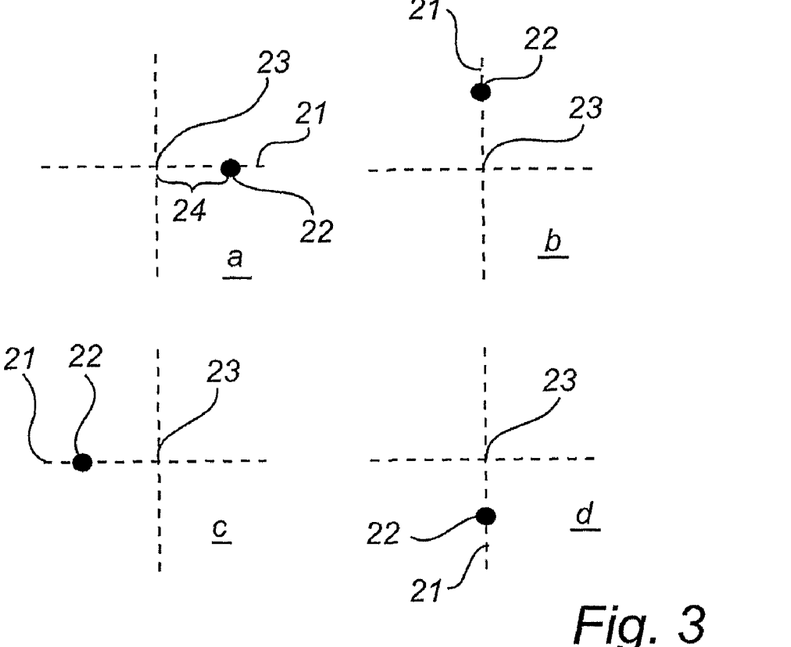
FIG. 3 shows four different locations of a coding symbol in an embodiment of a position code.

The actual position code as applied on a base is made up of simple graphical symbols or marks 22 which can assume four different values, 0-3, depending on their respective position in relation to a nominal position 23 or raster point. As seen in FIG. 3, each symbol 22 has the shape of a dot and is displaced a distance 24 in one of four different directions relative to the nominal position 23. The nominal position 23 is at an intersection between raster lines 21 in a visible or invisible or virtual raster or grid. The value coded by the symbol is determined by the direction of the displacement. Each symbol value 0-3 can be converted into one bit which is used for coding an x coordinate and one bit which is used for coding a y coordinate, i.e. into the pairs of bits (0,0), (0,1), (1,0), and (1,1). Thus, the coding is made separately in the x direction and the y direction, but the graphical coding is made with a symbol which is common to the x and y bits.

It should be mentioned that the coding may for instance be as follow:

| Displacement | Bit pair (x, y) |
| --- | --- |
| Right | 0, 1 |
| Up | 0, 0 |
| Left | 1, 0 |
| Down | 1, 1 |

The distance 24 is suitably not less than about ⅛ and not more than about ¼, preferably about ⅙, of the distance between two adjacent raster lines 21.

Each position is coded by 6*6 symbols which can thus be converted into a 6*6 bit matrix for an x coordinate and a 6*6 bit matrix for a y coordinate for the position. If the x bit matrix is considered, this can be divided into six columns of six bits each. Each sequence of bits in a column constitutes a partial sequence in a 63-bit-long cyclic main number sequence which has the property that if a partial sequence having a length of six bits is selected, this has an unambiguously determined place in the main number sequence. The six columns can thus be converted into six position numbers or sequence values which correspond to six places in the main number sequence. Between these six position numbers, five difference numbers can be formed in neighboring pairs, which constitute a partial sequence of the difference number sequence and which thus have an unambiguously determined place in the same and, consequently, an unambiguously determined place along the x axis. For a certain x coordinate, the position numbers will vary depending on the y coordinate. On the other hand, the difference numbers will be the same independently of the y coordinate, since the position numbers always vary according to the main number sequence, which is repeated cyclically in the columns in the entire position-coding pattern.

Correspondingly, six rows in the y bit matrix define six position numbers in the main number sequence. These six position numbers define five difference numbers, which constitute a partial sequence of the difference number sequence and which thus have an unambiguously determined place along the y axis.

Figure 4:
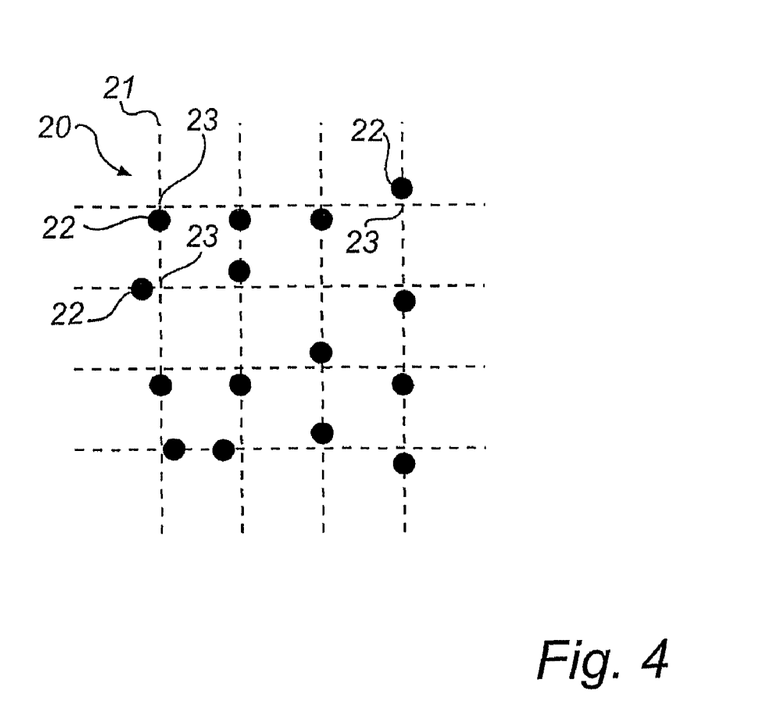
FIG. 4 is a schematic illustration of an embodiment of a part of a position code.

FIG. 4 shows a very small part of the above-described specific position code with 4*4 symbols. The raster lines 21 are shown in the figure for illustration purposes only. In general, the raster is virtual.

When a digital pen is used on the position code, it may capture images of different parts of the position code. The images may contain considerably more than 6*6 symbols. Thus the position code may be decoded based on different sets of 6*6 symbols if a larger number of symbols are visible in the image. Surrounding symbols may also be used in the decoding, inter alia, for error detection and/or correction. It should however be noted that even if the field of view of the digital pen comprises a larger number of symbols than is strictly required for the decoding of a position, the numbers of useful symbols in the recorded image may be considerably smaller due to e.g. image distortion.

The above-described exemplary position code is of a so called "floating type". It means that any arbitrary partial area comprising a predetermined number of symbols, here 6*6 symbols, will define a position and that at least some of the symbols in the arbitrary partial area contribute to the coding of more than one position. Otherwise stated, if the arbitrary partial area is moved a symbol distance up, down, to the left or to the right, a new position will be defined by the symbols in the arbitrary partial area thus moved. Thus, a unique x,y coordinate can be determined for each coding symbol in the position-coding pattern.

The above-described exemplary position code is capable of coding a very large number of unique absolute positions. The positions can be considered as jointly defining a huge imaginary surface. The positions coded on a base are positions on this imaginary surface and the origin of the position coordinates is the origin of the imaginary surface.

The imaginary surface or the overall position code can be logically subdivided into pages of different sizes. Any unit, e.g. a digital pen or a computer, having knowledge about the subdivision of the imaginary surface may thus convert a position on the imaginary surface recorded from a base to an indication of the corresponding page and a local position on that page.

Also, different bases may be provided with different subsets of the overall position code.

It should be emphasized that the position code described above is just an example. Other kinds of position codes, e.g. position codes coding fewer positions and having the origin on the base, could also be used to create a combined code.

Figure 5:
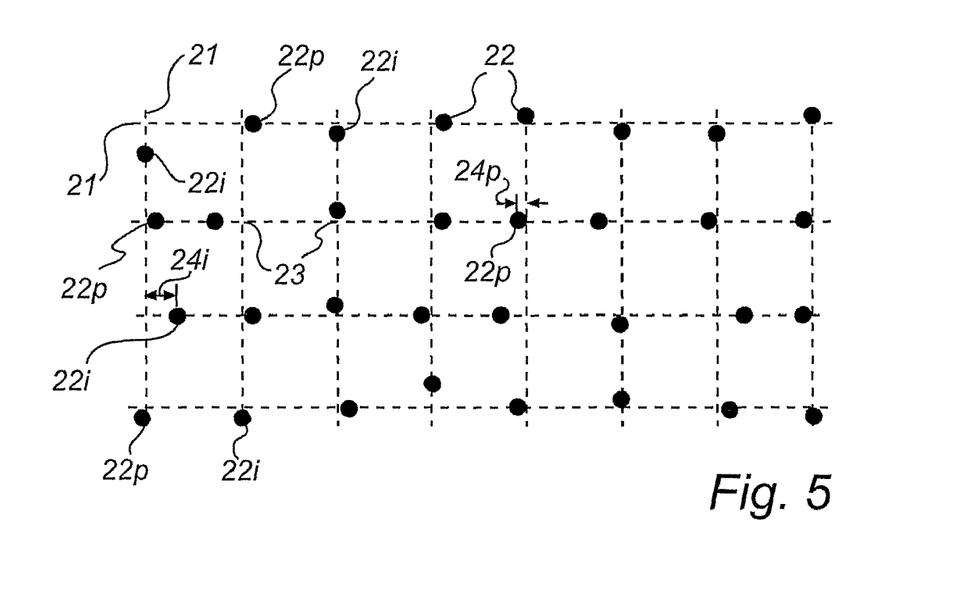
FIG. 5 schematically shows the different displacements of the coding symbols in an embodiment of a combined code.

Next an embodiment of an information code will be described more in detail with reference to FIGS. 5-7.

Generally, an information code can be overlaid on a position code either by being superimposed on the position code, in which case the piece of information is coded by symbols which are also used in the position code for coding positions, or by being interleaved with the position code, in which case the position code and the information code use separate symbols for the coding of positions and information, respectively. A combination of interleaving and superimposition is also conceivable. In that case some of the symbols in the combined code are used for position coding as well as information coding, some for position coding only and some for information coding only.

An information code may be overlaid on a position code on either the whole extent of the position code on the base or only part(s) thereof.

An information code and a position code can be graphically differently or identically coded on a base. If separate symbols are used for the position code and the information code, such as when the codes are interleaved, the graphical representation of the information code symbols and the position code symbols, respectively, may be made independently of each other. Both codes may use the same graphical parameter, e.g. dots of different sizes to code different values of the symbols. Or the codes may use different parameters. The information code may e.g. use slashes that are differently rotated to code different values, whereas the position code may use dots of different shapes to code different values.

If the information code and the position code share some symbols, one and the same parameter of the symbols may be used for coding the information code value and the position code value. Alternatively different parameters may be used. In the first case, the different combinations of a position code value and an information code value may e.g. be coded in different sizes of the symbols or in the displacements in different directions of the symbols. In the second case, the position code value may e.g. be coded in the direction of displacement of a dot and the information code value may be coded by different colors or color intensities of the dot.

The symbols of a combined position and information code may be divided into groups according to predetermined rules. Each group may comprise a predetermined number of symbols belonging to the position code and a predetermined number of symbols belonging to the information code. The groups can be formed in any conceivable way provided that there is an algorithmic way of correlating symbol location, i.e. position on a base as determined by the position code, with a specific coding symbol of the information code. The symbols may for instance be divided into cells which tile the combined code, like in FIG. 2. A cell could be defined as a coherent area in the combined code, within which all the information coding symbols code one and the same instance of the information item. The size and the shape of the cells may vary between different bases and depending on the piece of information to be coded in the information code. The groups may e.g. include 32, 64, 128, 256 or 1024 symbols belonging to the information code.

As an alternative to the algorithmic way of correlating symbol location with a specific coding symbol of the information code, the cells may be marked graphically on the base, e.g. by additional marks on the base or by a specific feature of marks belonging to the position code and/or the information code, so that the boundaries of the cells can be optically detected.

As indicated above, each group of symbols may include a larger number of symbols than can be seen by the pen within its field of view.

All groups may code the same piece of information or possibly a small number of different pieces of information. In the latter case, a decoding device needs to be able to distinguish which groups code a first piece of information, which groups code a second piece of information and so on.

Below an example of a specific implementation of a combined code which is applied on a base, e.g. a paper, is described with reference to FIG. 5, which schematically shows a small part of a combined code. All symbols 22 in FIG. 5 are used for the position coding and thus belong to the position code. They are furthermore all offset in either of four directions from a respective nominal position 23, which is defined by an intersection of the raster lines or grid lines 21.

The information code is superimposed on the position code, such that the information code makes use of symbols which are also used for coding positions. In this example every other symbol in the position code (e.g. where (x+y=0 modulo 2)) starting from the upper left corner is used for the information code. In FIG. 5 dots $22i$ belong both to the information code and the position code, whereas dots $22p$ belong only to the position code. The positions are coded by a variation in the direction of displacement of the coding symbols belonging to the position code. The size of the displacement $24p$ is the same for all four directions. The information item is coded by a variation in the extent of the displacement of the coding symbols belonging to the information code. In this example, each information coding symbol is either offset the ordinary distance $24p$ from the nominal position to code a "0" or twice the ordinary distance $24i$ from the nominal position to code a "1".

Figure 6:
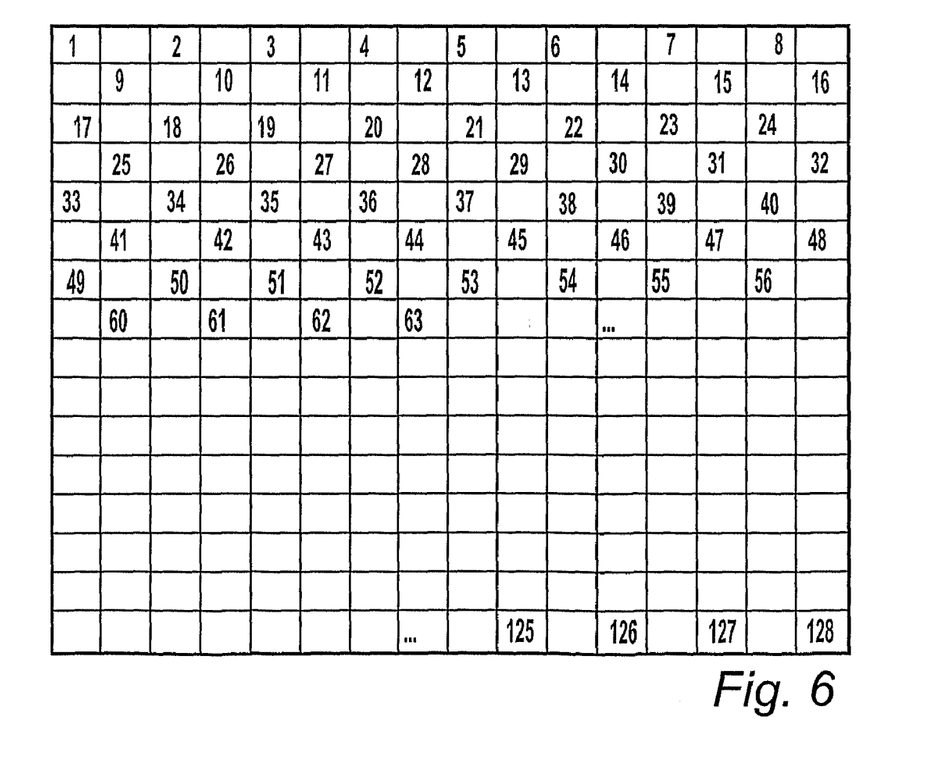
FIG. 6 schematically illustrates an example of a cell of a combined code.

FIG. 6 schematically shows an example of a cell of a combined code. The cell of FIG. 6 comprises 16*16 coding symbols of the position code. Every other symbol is used to code information, like in the example of FIG. 5. Every square in FIG. 6 corresponds to a coding symbol of the position code. The numbered squares correspond to the coding symbols that also belong to the information code. In this case, the information item may consist of 128 bits of data at a maximum and each bit is coded by one information coding symbol. More generally, an information item may consist of a plurality of information item elements, each of which may be coded by one or more coding symbols.

Some of the symbols may be used for error correction, using e.g. an industry standard binary BCH code, such as BCH(127,99,9), which means that 127 bits are used for information coding, of which 99 bits are used for data and 28 bits for error correction, making it possible to correct for four bit errors or eight missing bits. One bit is left unused. Other error correcting schemes are of course conceivable.

The sequence of information bits may be identical in all cells of an information code. However, the sequence may also be permuted between cells in order to increase the probability of catching all the information item elements during the recording of the pen strokes on the base. A permutation function for the information bits 1 . . . 128 of FIG. 6 may have the following form:

$$P(xi, yi, \text{bit\_number}) = \text{permuted\_bit\_number}$$

Where xi and yi are integers representing the cell coordinates and bit-number is an integer between 1-128 indicating the sequential number of the bit in the cell. xi can be calculated as the integer part of x/xsize, where xsize is the cell size in the x-direction expressed as number of symbols and x is the x-coordinate of the current coding symbol in the overall position code. yi can be calculated in the corresponding way as the integer part of y/ysize, where ysize is the cell size in the ydirection expressed as number of symbols and y is ycoordinate of the current coding symbol in the overall position code. Bit_number may be calculated as Bit_number=x mod xsize+ C*y mod ysize, where C is a constant equal to the number of information code elements in the x-direction, which is 8 in this example. Permuted_bit_number will also be a number between 1 and 128 representing the number of the information item element. Thus, in this example the function P is a oneto-one mapping of 1 . . . 128 onto 1 . . . 128.

The skilled person can conceive different functions P that result in more or less complicated permutations of the information bit sequence.

Figure 7:
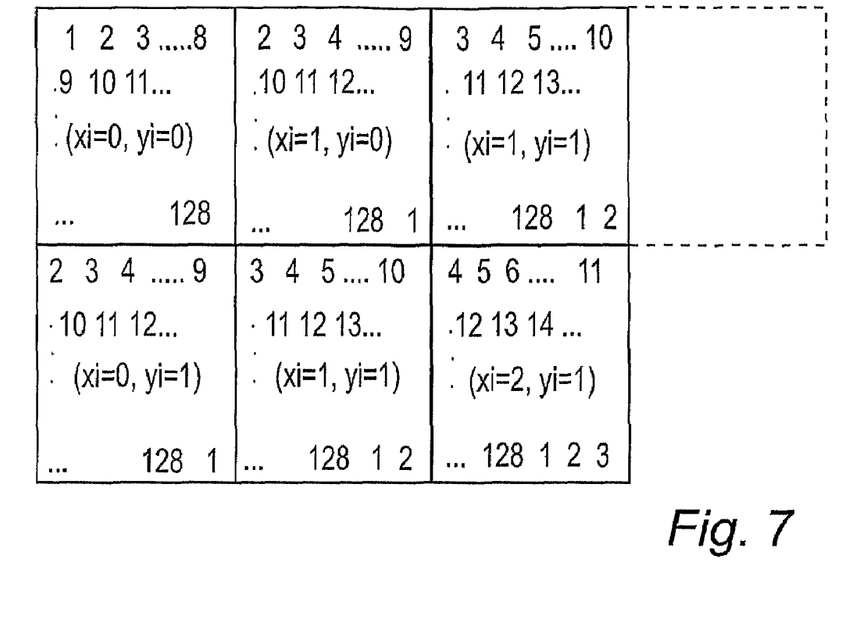
FIG. 7 schematically shows how elements of information items may be permuted in one embodiment of a combined code.

FIG. 7 schematically illustrates the permutation resulting from the following permutation function:

$$P(xi, yi, \text{bit\_number}) = (\text{bit\_number} + xi + yi) \bmod 128 + 1$$

FIG. 7 shows six exemplary information code cells. The cell coordinates of each cell are indicated inside each cell. As is evident from FIG. 7, the permutation function shifts the information bit sequence one step forward when moving one cell to the right or one cell downwards.

In the above-described example, 128 binary bits can be coded into the information code cell. Thus, any kind of information that can be represented by 128 bits, including any error correction, may be coded into the exemplary information code cell of FIG. 6. By using a larger part of the coding symbols in the information code cell, e.g. every coding symbol instead of every other coding symbol, the information coding density may be increased without increasing the cell size. Alternatively or as a supplement, the cell size may be increased. This may however result in that more pen strokes need to be made on the base before the information item is captured.

The above-described permutation is just an example of how the coding of the information item may be varied between the cells in order to increase the likelihood that all elements of the information item are seen during different kinds of pen strokes. Another kind of variation is obtained by not coding the complete information item in every cell, but to leave out one or more information item elements and/or to code one or more elements more than once in one or more cells. It is realized that these different methods of varying the coding of an information item may also be used in combined codes where the cell comprises the same number of coding symbols as is required for the coding of a position or less.

Next will be described an example of how the combined code could be generated. In this example, it is assumed that the information item consists of 128 bits without any error correction and that the permutation function P is the one indicated above.

A combined code may be generated in a coding module of an apparatus, which may comprise a processor of some suitable type, different kinds of memory and other units typically used for data processing. The apparatus may be a general computer, a printer, another standard device or special-purpose device. It may be an apparatus which is local or remote in relation to the user.

In a first step of the code generation, the coding process of the coding module generates the position code to be provided on a base. To this end, the coding module may receive as an input signal an indication of the size of the position code to be created, e.g. the number of columns and rows to be included in the position code, and the coordinate area to be used, e.g. starting from a specific x,y coordinate pair. The input may originate from e.g. a user or the system.

Based on the input, the coding process may create a matrix or another data structure representing all the coding symbols of the position code. Next it may step through all the elements in the matrix associating, with each element, a value which indicates which graphical state the corresponding coding symbol shall have when applied on the base in order to code the relevant position. In this example the value indicates the direction in which a symbol is to be displaced.

A more detailed example of how the displacement values of coding symbols coding a specific position may be calculated could be found in U.S. Pat. No. 6,667,695.

The output of the position code generation step may be the matrix with the graphical state values, which is one example of an electronic representation of the position code. The position code data may be organized in different data structures, e.g. a list.

In a next step, the information item may be input to the coding module, either by the user or from another part of the system. The information item may e.g. be static and used for all documents, it may vary depending on what subset of the position code is used, or it may vary freely as decided by the user. Conversion of information item data to binary format and calculation of error correction bits may also be performed in this step.

Before coding of the information item starts, the cell size may need to be defined. This can be done e.g. by a user selection or based on the information item to be coded. The cell size may also be predetermined and one and the same for all combined codes created by the relevant coding process.

To overlay the information code on the position code and code the information item into the coding symbols of the position code, all the points in the position code matrix may be looped over by the coding process. More specifically, the coding process may use a predetermined algorithm to determine which symbols in the position code should be used for the information code. In this example, the coding process skips every other symbol in the position code matrix to make the information coding in a chess-board fashion, as has been described above in connection with FIG. 5.

For each information coding symbol, the coordinates of the position code may furthermore be used to calculate xi, yi and bit-number as described above. Then the permutation function P(xi, yi, bit_number) may be used for deciding which information item element is to be encoded by the current information coding symbol. If the binary value of the information item element is 1, the graphical state value of the coding symbol may be modified to indicate that the offset should be twice as big as that used for position coding. If on the other hand the binary value of the information item element is 0, the graphical state value of the coding symbol is left unmodified to indicate that the normal offset is to be used when printing that coding symbol. This step, thus, means that cells are defined in the position code and that the information item is coded in the cells.

As a final step a print file may be created from the graphical state matrix and the combined code printed on a base. The print file may also include instructions to the printer to print a document, a form, an image or any other kind of information together with the combined code.

The combined code on the one hand and any other information on the other hand may be printed on the base using one and the same ink or separate inks, where the ink used for printing the other information is transparent to the digital pen. When the same ink is used both for the combined code and the other information, the combined code may be partly obscured if the other information is overlaid on the combined code and special account may have to be taken to this fact in the decoding process.

It should be emphasized that the description above of the encoding process is made for illustration purpose only. The skilled person may conceive other and/or more efficient processes for implementing the generation of the combined code.

Also, the example above relates to a case where the information item consists of binary data and each information coding symbol codes one bit of information. The skilled person can easily modify the example above for a case where each information item coding symbol codes more than one bit of data or a case where each information item element is coded by more than one coding symbol.

Figure 8:
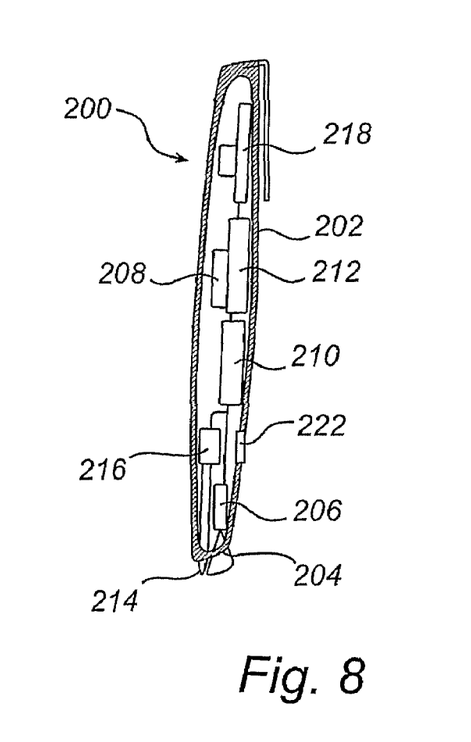
FIG. 8 schematically shows an embodiment of a digital pen which can be used for recording and decoding a combined code.

Before describing an example of a method for decoding the combined code, an example of a digital pen, which can be used for the recording and/or decoding of a combined code, will be described. To this end, FIG. 8 schematically shows an embodiment of a digital pen 200. The pen 200 has a pen-shaped casing or shell 202 that defines a window or opening 204, through which images are recorded. The casing contains a camera system, an electronics system and a power supply.

The camera system 206 comprises at least one illuminating light source, a lens arrangement and an optical image reader (not shown in the Figure). The light source, suitably a light-emitting diode (LED) or laser diode, illuminates a part of the area that can be viewed through the window 204, by means of infrared radiation. An image of the viewed area is projected on the image reader by means of the lens arrangement. The image reader may be a two-dimensional CCD or CMOS detector which may be triggered to capture images at a flexible, adaptive or fixed rate, typically of about 70-100 Hz. Alternatively, the sensor may include a magnetic sensor array for detection of a magnetic property of the symbols. Still further, the sensor may be designed to form an image of any chemical, acoustic, capacitive or inductive property of the symbols.

The power supply for the digital pen is a battery 208, which alternatively can be replaced by or supplemented by mains power (not shown).

The electronics system comprises a control unit 210 which is connected to a memory block 212. The control unit 210 is responsible for the different functions in the pen and can advantageously be implemented by a commercially available microprocessor such as a CPU ("Central Processing Unit"), by a DSP ("Digital Signal Processor") or by some other programmable logical device, such as an FPGA ("Field Programmable Gate Array") or alternatively an ASIC ("Application-Specific Integrated Circuit"), discrete analog and digital components, or some combination of the above. The memory block 212 comprises preferably different types of memory, such as a working memory (e.g. a RAM) and a program code and persistent storage memory (a non-volatile memory, e.g. flash memory). Associated software is stored in the memory block 212 and is executed by the control unit 210. Software for decoding a combined information and position code may thus be stored in memory block 212 and executed by the control unit 210.

The casing 202 also carries a pen point 214 which allows the user to write or draw physically on a surface by an ordinary pigment-based marking ink being deposited thereon. The marking ink in the pen point 214 is suitably transparent to the illuminating radiation in order to avoid interference with the opto-electronic detection in the electronic pen. A contact sensor 216 is operatively connected to the pen point 214 to detect when the pen is applied to (pen down) and/or lifted from (pen up), and optionally to allow for determination of the application force. Based on the output of the contact sensor 216, the camera system 206 is controlled to capture images between a pen down and a pen up.

The electronics system further comprises a communications interface 218 for the communication of data to a nearby or remote apparatus such as a computer, mobile telephone, PDA, network server, etc. The communications interface 218 may thus provide components for wired or wireless short-range communication (e.g. USB, RS232, radio transmission, infrared transmission, ultrasound transmission, inductive coupling, etc), and/or components for wired or wireless remote communication, typically via a computer, telephone or satellite communications network.

The pen may also include an MMI (Man Machine Interface) which is selectively activated for user feedback. The MMI may include a display, an indicator lamp, a vibrator, a speaker, etc.

Still further, the pen may include one or more buttons 222 by means of which it can be activated and/or controlled.

The above-described embodiment of the pen 200 is but an example. Other digital pens with a subset of the above-mentioned components and/or partly or wholly other components and/or partly or wholly other designs may be used to record a combined code. A less complex digital pen may for instance only be capable of recording images and transferring them to another apparatus for further processing. In another embodiment the digital pen may detect certain features of the code, such as locations of dots, and transfers information thereof to another apparatus for further processing.

Below, one exemplary embodiment of a method for decoding a combined code will be described with reference to the above-described digital pen 200 and the above-described exemplary combined code.

When the above-described pen 200 is used on a base with a combined code, the contact sensor 216 detects when the pen point is pressed against the base and triggers the camera system 206 to capture images of the part area of the combined code within its field of view. The camera continues to capture images until the contact sensor 216 detects that the pen is lifted from the base. The series of images captured by the camera system 206 constitutes a series of electronic representations of different part areas of the combined code.

The decoding of combined code in the series of electronic representations may be carried out in a decoding module of the digital pen or in a decoding module of another apparatus to which the electronic representations are transferred from the pen. The electronic representations may be transferred as captured or in a more or less processed form. The decoding may alternatively be divided between the digital pen and another apparatus, so that the digital pen performs a first part of the decoding and the other apparatus performs a second part.

In a first step of the decoding process of the decoding module, a position is determined for an image captured by the pen. Decoding of a position code of the above-exemplified type, may comprise the steps of localizing the coding symbols in the image, fitting a raster to the coding symbols, determining the direction of displacements of the coding symbols from the nominal positions defined by the raster line intersections and calculating the positions based on the displacements of the coding symbol. For a more detailed description of how the different steps of the position decoding can be carried for this kind of position code, it is referred to e.g. U.S. Pat. No. 6,667,695 and US 2002/0044138, which is hereby incorporated by reference.

It should also be mentioned that the positions need not necessarily be determined from the position code by calculation. The position code can also be used to determine a position by matching the coding symbols of a captured image against a representation of the position code within a certain area where the pen is predicted to be or by matching the coding symbols in a received electronic representation against a previously received electronic representation in order to establish a relative position.

When the locations of the coding symbols in an image have been determined and an x-y position referring to a coding symbol in the image has been decoded, the part of the information code seen in the image may be decoded. For the decoding, two memory buffers associated with the decoding module are used. Each of them has the same size as the piece of information coded in the information code, i.e. 128 bits in this example. In the following the memory buffers are called an accumulator buffer acc and a contributor buffer con.

For each coding symbol in the image belonging to the information code the following steps are carried out:
1) the distance offs between the center of the coding symbol and the associated grid intersection is calculated.
2) integer xi, integer yi and integer bit-number are calculated in the same way as indicated above.
3) Permuted-bit-number is calculated using P, xi, yi and bit-number.
4) The accumulator buffer acc is updated with offs: acc[permuted_bit_number]+=offs
5) The contributor buffer con is updated with 1: con[permuted_bit_number]+=1

Thus the accumulator buffer accumulates the respective displacements for the different code elements of the information code, whereas the contributor buffer keeps track of how many times a specific bit of the information code has been seen by the pen.

When all the images have been processed as indicated above, the resulting offsets are calculated for all information item elements: offset [n]=acc[n]/con[n], where n is an index between 1 and 128. If con has a value of 0 for any information item element that means that this information item element is missing from this stroke.

As an alternative, the contributor buffer may be updated not by 1, but by a value reflecting the reliability of the observation of the relevant coding symbol of the information code. Coding symbols close to the edges of an image may e.g. be given less weight because they are typically more affected by perspective distorsions.

Then a threshold is applied and bit values are assigned accordingly:
if offset[n]>threshold_value, then bit[n]=1 else bit:[n]=0

If an error-correction mechanism was used when coding the combined code, the decoding process now also uses the same error-correction mechanism to detect and correct for errors and/or missing bits.

The above processing of the electronic representations results in a series of positions which constitutes an electronic representation of the pen movement over the base during one or more pen strokes, that is in one or more electronic pen strokes. It also results in a partly or wholly decoded information item.

In a final step, the decoding process may associate the information item with the electronic pen strokes. As indicated above, each position obtained from the position code may be converted to a page indication and a local position on that page. A pen stroke may typically be represented as a page indication and a series of local positions. In this way the pen is capable of keeping track of which page a stroke is written on. When an information item has been decoded, the decoding process may check if an information item already has been decoded and associated with the current page. If so, the decoding process may optionally check bit-for-bit consistency with the previously stored information item. If the bit data of the current information item is sufficiently similar to the bit data of the previous information item, then the bit data for the different pen strokes may be aggregated. In this way the likelihood of a correct decoding of the information item may be increased. If, on the contrary, the bit data of the decoded information items are radically different, this might indicate that two different pages have been written on, and the decoding process may take appropriate action.

Sometimes it may be desirable to use the combined code on a multi-page document. If the decoding process has the possibility to establish that pen strokes made on different pages of a multi-page document belong to one and the same document having the same information code on all the pages, it may use this fact to gather information about the information item from all the pen strokes on the different pages and thereby increase the possibility of correct decoding of the information item. The decoding process may for instance have access to information which indicates that specific groupings of pages may never represent separate documents, but only appear in multi-page documents. The decoding process may also or alternatively compare information bit data decoded from pen strokes from different pages as indicated above and make assumptions about connected pages based on the similarity of the data.

Correspondingly, the decoding process may either have access to information about the cell size used for the information code on specific pages. Alternatively the decoding process may perform the decoding in parallel for different cell sizes. When information bit data gathered from different pen strokes is compared, it will soon be evident which cell size is used for the coding.

In the following, some further examples of information items that could be useful to include in the combined code will be given.

A digital pen typically has a unique identity code stored in its memory. This identity code could be coded as an information item on a base in order to restrict usage of the base. The digital pen may include hardware and/or software which checks the identity code decoded from a combined code on a base and which only allows storing or output of recorded pen strokes from the same base if the identity code on the base corresponds to the one stored in the pen. In this way the use of a specific base could be restricted to a specific pen. The use of a base can alternatively be restricted to a group of digital pens. In this case, the pens in the group may store a group identity, which is coded on the base to restrict use of the base to this specific group of pens. Alternatively, the individual identity codes of the pens in the group could be processed, e.g. by a mathematical algorithm, in order to produce an appropriate information item to be included in a combined code on the base. The individual identity codes can for instance be hashed together, making it unlikely that a pen outside the intended group of pen would be able to use the base. The identity code (either the individual identity code or a group identity code) of a pen could be stored in a computer generating the combined code to be printed on a base or be retrieved from the pen, e.g. when it is placed in a stand connected to the computer, or be retrieved from any other appropriate source in connection with the generation of the combined code.

In one embodiment, the information item may comprise information about a MMI model to use for the current base. The digital pen may for instance store different MMI models which may be used on different parts of a position code, e.g. on different pages thereof, and the information item may indicate which of these MMI models to use. A MMI model may e.g. specify different visual, aural and/or tactile feedbacks to be given by the pen in different situations, such as when recording a predetermined set of coordinates. In one embodiment a first MMI model may for instance specify that the pen should give visual feedback via an LED when a set of coordinates associated with a send command is detected, whereas a second MMI model may specify that the pen should vibrate in the same situation.

In another embodiment, the information item may comprise an indication of how the pen is to process recorded pen strokes. The information item may e.g. indicate whether the pen is to store the pen strokes until the user prompts the pen to send them to an external unit or the pen is to stream the pen strokes automatically and more or less immediately to an external unit. Or else the information item may be an address indication which indicates to which unit pen strokes are to be sent, or a routing indication which indicates through which device the pen strokes are to be routed, e.g. through a mobile phone or a PC. The address indication and the routing indication may be provided following a selection made by the user in connection with the printing of the document.

In a further embodiment, the information item may comprise data to be used by the pen or another appropriate device when processing the pen strokes or a reference to an algorithm to be used by the pen or another appropriate device when processing the pen strokes. The data may comprise e.g. a melody or tune to be played by the device that receives the pen strokes, or information about the number of pages in a multi-page document to which the current page belong, or the identity of a document and a page number thereof, or the correct answers to questions printed on the document. The data to be included in the information item may be selected or specified by the user in connection with the printing of the document. The data may also comprise a reference to e.g. an application or data which is stored in the pen or elsewhere.

In the above description of exemplary embodiments, it has been indicated that the position code may use coding marks which are displaced in different directions from nominal positions to code positions and that an information item may be coded in the position code by displacing the coding marks to a different extent (e.g. single or double offset) from the nominal positions. It should be noticed that this concept could be used independently of the cell size. Thus, the cells may include a larger number or a lesser number or the same number of coding marks as is used for determining a position. The concept may also be used independently of the shape or size or color or other parameters of the appearance of the coding marks and independently of the number of directions in which the coding marks may be displaced from the nominal positions, and independently of which these directions are. Data may also be coded in the information code by placing coding marks at more than two different distances from the nominal positions. In this way more data may be coded in the information item. In one embodiment coding marks are displaced a first distance in one of a predetermined number of different directions to code positions, and then the positions of some of the marks are modified so that they are displaced either a second or third distance to code the information item. The different distances need not be multiples of each other. In another embodiment, some of the coding marks code values by being displaced a first distance in one of a first predetermined number of directions, whereas other of the coding marks code values by being displaced a second or third distance in one of a second predetermined number of directions, where the first and second distances may be the same or different. The concept of displacing coding marks in different directions and to a different extent could also be used in a code where more than one coding mark is associated with each nominal position, and/or where some marks are placed in their respective nominal position. The concept can also be used in a position code to increase the number of positions.

The invention claimed is:

1. A method for generating a combined position and information code to be applied on a base, said code including a plurality of coding marks, each of which is displaced from one of a plurality of nominal positions defined by a grid, comprising:

generating an electronic representation of a position code, which codes a plurality of positions, each position being coded by a first predetermined number of coding marks;

assigning a graphical state value to each one of said plurality of coding marks in order to encode said plurality of positions, said graphical state value indicating a direction in which the coding mark is to be displaced from a corresponding nominal position when the coding mark is applied on the base;

overlaying an electronic representation of an information code on the position code to create the combined code, said information code coding at least one information item by using a second predetermined number of coding marks; and selectively modifying the graphical state value of at least one of the second predetermined number of coding marks to encode the information item, wherein the modified graphical state value indicates that the coding mark is to be applied on the base with a size of the displacement from the corresponding nominal position that is different from the size of the displacement of the coding marks having unmodified graphical state values.

2. A method as claimed in claim 1, wherein the position code is divided into cells, each cell including at least the second predetermined number of coding marks and each cell encoding one information item.

3. A method as claimed in claim 2, wherein a single information item is repeatedly coded in the cells.

4. A method as claimed in claim 1, wherein the position code is intended for electronic capturing of handwriting.

5. A method as claimed in claim 1, wherein all coding marks have an identical appearance.

6. An apparatus for generating a combined position and information code to be applied on a base, said code including a plurality of coding marks, each of which is displaced from one of a plurality of nominal positions defined by a grid, comprising:

a memory device storing instructions; and a processor executing the instructions for:

generating an electronic representation of a position code, which codes a plurality of positions, each position being coded by a first predetermined number of coding marks;

assigning a graphical state value to each one of said plurality of coding marks in order to encode said plurality of positions, said graphical state value indicating a direction in which the coding mark is to be displaced from a corresponding nominal position when the coding mark is applied on the base;

overlaying an electronic representation of an information code on the position code to create the combined code, said information code coding at least one information item by using a second predetermined number of coding marks; and selectively modifying the graphical state value of at least one of the second predetermined number of coding marks to encode the information item, wherein the modified graphical state value indicates that the coding mark is to be applied on the base with a size of the displacement from the corresponding nominal position that is different from the size of the displacement of the coding marks having unmodified graphical state values.

7. An apparatus as claimed in claim 6, wherein the position code is divided into cells, each cell including at least the second predetermined number of coding marks and each cell encoding one information item.

8. An apparatus as claimed in claim 7, wherein a single information item is repeatedly coded in the cells.

9. An apparatus as claimed in claim 6, wherein the position code is intended for electronic capturing of handwriting.

10. An apparatus as claimed in claim 6, wherein all coding marks have an identical appearance.

11. A method for decoding a combined position and information code, said code including a plurality of coding marks, each of which is displaced from one of a plurality of nominal positions defined by a grid, comprising:
   receiving an electronic representation of a part of said combined position and information code such that a part of information code is overlaid on a part of position code in the combined code;
   localizing coding marks in said electronic representation;
   identifying the grid;
   determining a direction of displacement from one of the nominal positions of the localized coding marks;
   decoding a position on the basis of the directions of displacements of a first predetermined number of the localized coding marks;
   determining an amount of displacement between one of the nominal positions and each one of a second predetermined number of the localized coding marks; and
   decoding an information item on the basis of the amounts of displacements of said second predetermined number of coding marks, wherein a coding mark having an amount of displacement of a first size is decoded to a first value and a coding mark having an amount of displacement of a second size is decoded to a second value.

12. A method as claimed in claim 11, wherein at least one cell including said second predetermined number of coding marks is identified using the decoded position.

13. A method as claimed in claim 11, wherein successive electronic representations of a part of the combined position and information code are received, the position code in the combined code in said successive electronic representations being decoded to a sequence of positions constituting an electronic representation of handwriting and the information code in the combined code in said successive electronic representations being decoded to one information item.

14. A method as claimed in claim 11, wherein all coding marks have an identical appearance.

15. An apparatus for decoding a combined position and information code, said code including a plurality of coding marks, each of which is displaced from one of a plurality of nominal positions defined by a grid, comprising;
   a memory device storing instructions; and
   a processor executing the instructions for:
      receiving an electronic representation of a part of said combined position and information code such that a part of information code is overlaid on a part of position code in the combined code;
      localizing a coding mark in said electronic representation;
      identifying the grid;
      determining a direction of displacement from one of the nominal positions of the localized coding marks;
      decoding a position on the basis of the directions of displacements of a first predetermined number of the localized coding marks;
      determining an amount of displacement between one of the nominal positions and each one of a second predetermined number of the localized coding marks; and
      decoding an information item on the basis of the amounts of displacements of said second predetermined number of coding marks, wherein a coding mark having an amount of displacement of a first size is decoded to a first value and a coding mark having an amount of displacement of a second size is decoded to a second value.

16. A method as claimed in claim 15, wherein at least one cell including said second predetermined number of coding marks is identified using the decoded position.

17. A method as claimed in claim 15, wherein successive electronic representations of a part of the combined position and information code are received, the position code in the combined code in said successive electronic representations being decoded to a sequence of positions constituting an electronic representation of handwriting and the information code in the combined code in said successive electronic representations being decoded to one information item.

18. A method as claimed in claim 15, wherein all coding marks have an identical appearance.

* * * * *